US007850338B1

(12) United States Patent
Messina et al.

(10) Patent No.: US 7,850,338 B1
(45) Date of Patent: Dec. 14, 2010

(54) METHODS FOR DIRECTING LIGHT

(75) Inventors: Michael C. Messina, Hookset, NH (US); Sheila Bergeron Dunn, Mason, NH (US); Brian Thompson, Deering, NH (US)

(73) Assignee: Microscan Systems, Inc., Renton, WA (US)

( * ) Notice: Subject to any disclaimer, the term of this patent is extended or adjusted under 35 U.S.C. 154(b) by 533 days.

(21) Appl. No.: 11/903,332

(22) Filed: Sep. 21, 2007

Related U.S. Application Data

(60) Provisional application No. 60/846,939, filed on Sep. 25, 2006.

(51) Int. Cl.
*F21V 1/00* (2006.01)
(52) U.S. Cl. .............................. 362/235; 362/11; 362/85
(58) Field of Classification Search .................... 362/11, 362/16–18, 607, 616, 558, 234–236, 300, 362/303, 85, 235
See application file for complete search history.

(56) References Cited

U.S. PATENT DOCUMENTS

| | | | |
|---|---|---|---|
| 5,298,989 A | 3/1994 | Tsukahara et al. | |
| 5,461,417 A | 10/1995 | White | |
| 5,539,485 A | 7/1996 | White | |
| 5,604,550 A | 2/1997 | White | |
| 5,684,530 A | 11/1997 | White | |
| 5,761,540 A | 6/1998 | White | |
| 6,059,421 A | 5/2000 | White et al. | |
| 6,191,850 B1 | 2/2001 | Chiang | |
| 6,667,762 B1 | 12/2003 | Bouvier et al. | |
| 6,829,852 B1 | 12/2004 | Uehran | |
| 2002/0076096 A1* | 6/2002 | Silber et al. ................. | 382/152 |
| 2002/0167645 A1 | 11/2002 | Johnson | |
| 2002/0191102 A1 | 12/2002 | Yuyama et al. | |
| 2003/0053307 A1* | 3/2003 | Talamo et al. ............ | 362/153.1 |
| 2004/0174591 A1 | 9/2004 | Sander | |
| 2006/0103903 A1 | 5/2006 | Thomas | |
| 2006/0228018 A1 | 10/2006 | Abramovich | |
| 2007/0176848 A1 | 8/2007 | Ferren | |
| 2008/0106794 A1 | 5/2008 | Messina | |
| 2008/0131111 A1 | 6/2008 | Messina | |

FOREIGN PATENT DOCUMENTS

| | | |
|---|---|---|
| EP | 0 446 838 A2 | 9/1991 |
| WO | WO 99/20048 | 4/1999 |
| WO | WO 2008/039462 A2 | 4/2008 |

OTHER PUBLICATIONS

PCT/US2007/020695, International Search Report and Written Opinion of the International Searching Authority, mail date Apr. 16, 2008.
PCT/US2007/020695, International Preliminary Report on Patentability, date of issuance Mar. 31, 2009.
PCT/US2007/021034, International Search Report and Written Opinion of the International Searching Authority, mail date Apr. 21, 2008.
PCT/US2007/021034, International Preliminary Report on Patentability, date of issuance Mar. 31, 2009.

* cited by examiner

*Primary Examiner*—Sandra L O Shea
*Assistant Examiner*—Danielle Allen
(74) *Attorney, Agent, or Firm*—Blakely Sokoloff Taylor & Zafman LLP

(57) ABSTRACT

Certain exemplary embodiments can comprise a method, which can comprise controlling illumination of a set of illumination sources. The set of illumination sources can comprise a first subset of illumination sources and a second subset of illumination sources. Light from the set of illumination sources can be adapted to pass through a diffuser comprising a first zone and a second zone. The first zone can be physically and/or optically segregated from the second zone.

36 Claims, 11 Drawing Sheets

METHODS FOR DIRECTING LIGHT

CROSS-REFERENCES TO RELATED APPLICATIONS

This application claims priority to, and incorporates by reference herein in its entirety, pending U.S. Provisional Patent Application Ser. No. 60/846,939, filed 25 Sep. 2006.

BACKGROUND

Objects can be illuminated for camera imaging and/or Machine Vision applications via a light source. The light energy from the light source can be diffused by a light transmitting diffuser material. The objects can be illuminated by the diffuse light such as from behind. Improved devices, systems, and/or methods for illumination can be desirable for certain applications.

SUMMARY

Certain exemplary embodiments can comprise a method, which can comprise controlling illumination of a set of illumination sources. The set of illumination sources can comprise a first subset of illumination sources and a second subset of illumination sources. Light from the set of illumination sources can be adapted to pass through a diffuser comprising a first zone and a second zone. The first zone can be physically and/or optically segregated from the second zone.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method, which can comprise controlling illumination of a set of illumination sources. The set of illumination sources can comprise a first subset of illumination sources and a second subset of illumination sources. Light from the set of illumination sources can be adapted to pass through a diffuser comprising a first zone and a second zone. The first zone can be physically and/or optically segregated from the second zone.

Complex vision applications can be adapted to inspect certain features of one or more parts. Part inspections can utilize controlled lighting geometries. Controlling discrete lighting zones can offer an ability to illuminate specific features of a part that otherwise might not be discernable. Certain exemplary embodiments can provide a relatively uniform diffuse area of light with controllable zones.

Creating independent zones within the diffuser can involve two parameters:
- diffuser separation: a separation of the diffuser into physically and/or optically independent zones and/or an introduction of a light blocking membrane that fits between independent zones; and
- light source separation: dividing and/or controlling light output zones to compliment the independent zones.

Certain exemplary embodiments can utilize zone separation and/or discrete control of lighting. The separate diffuser segments can be separated by a substantially opaque light blocking membrane. Certain exemplary embodiments can comprise a light source that has discretely controllable zones that substantially correspond to segment geometry of zones of the diffuser. Discrete control of lighting zones in a single stand-alone product can provide a system with flexibility and/or control over part illumination. Certain exemplary embodiments can be utilized in Machine Vision applications.

Certain exemplary embodiments can be fabricated from common materials used in the Vision Industry. For example, in certain exemplary embodiments, diffusers can be machined out of acrylic. The light blocking membrane can be anything from machined aluminum to a piece of substantially opaque plastic cut from a sheet. The light source can be an array of Light Emitting Diodes (LED's), populated on a circuit board, incandescent bulbs, fiber optically transmitted lights from remotely located sources, electro-luminescent panels, and/or mini fluorescent bulbs, etc. Certain exemplary embodiments can be mounted in proximity to a camera lens of a Vision Inspection System, and can emit light onto a part and/or component being inspected. Zones can be controlled to create a contrast on desired features of the part. Specific geometries and materials can be utilized, which can be related to application specific conditions. Certain exemplary embodiments can have varying geometries and/or sizes based on the application or part features being inspected.

Figure 1:
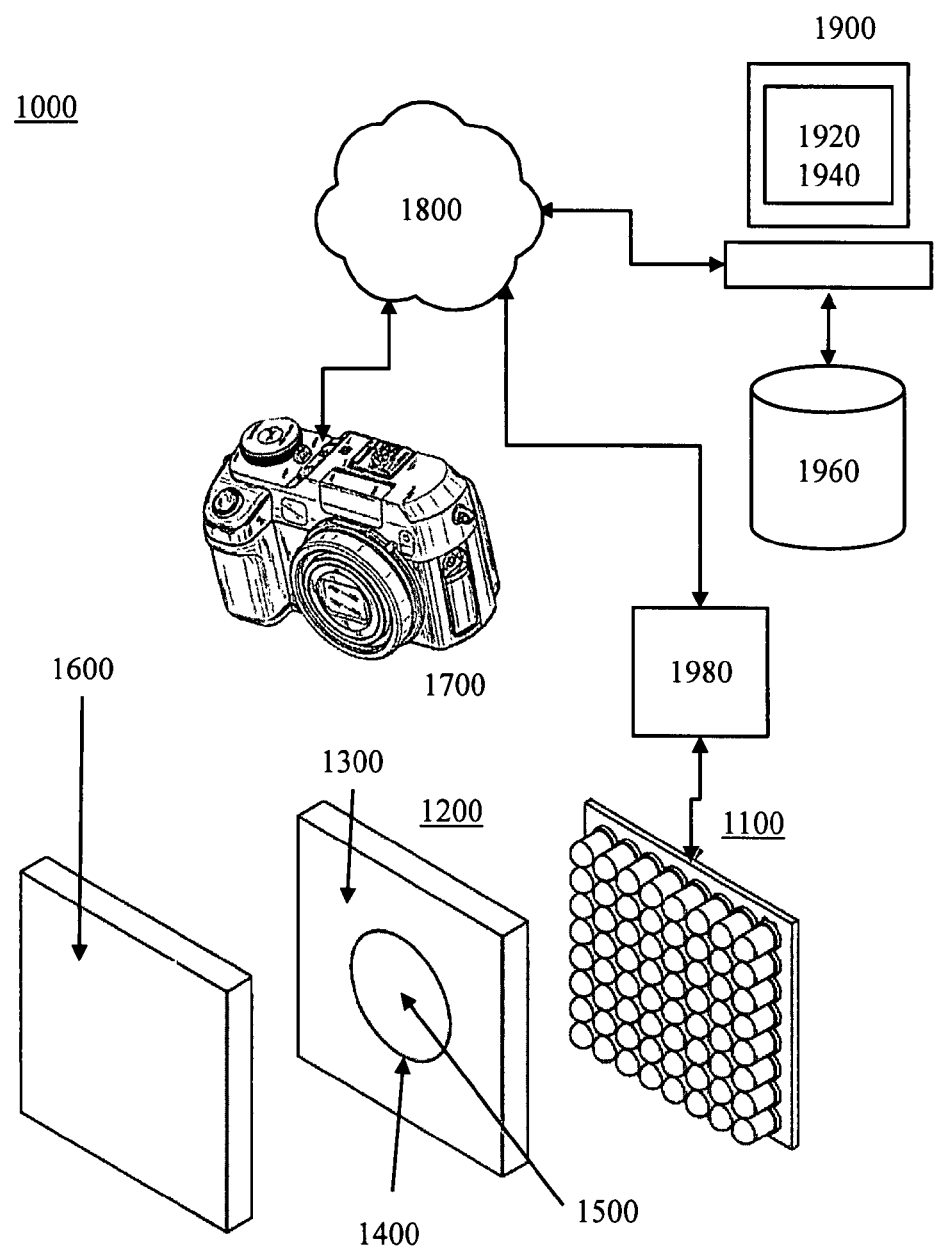
FIG. 1 is a block diagram of an exemplary embodiment of a system 1000.

FIG. 1 is a block diagram of an exemplary embodiment of a system 1000, which can comprise a set of light sources 1100. Set of light sources 1100 can be adapted to illuminate a component 1600 via light passed through a diffuser 1200. Diffuser 1200 can comprise a first substantially translucent zone 1300 and second substantially translucent zone 1500. A substantially opaque light blocking membrane 1400 can substantially physically and/or optically segregate first zone 1300 and second zone 1500. Set of light sources 1100 can comprise a first subset of light sources and a second subset of light sources, each of which can correspond in size and shape to first zone 1300 and second zone 1500. A camera and/or Machine Vision system 1700 can be adapted to capture an image of component 1600, which can be illuminated by set of light sources 1100. Camera and/or Machine Vision system 1700 can be adapted to interpret an obtained image illuminated by set of light sources 1100. While two zones are illustrated in diffuser 1200 in the exemplary embodiment of system 1000, diffuser 1200 can comprise any number of distinct zones, with each distinct zone physically and/or optically segregated by a corresponding substantially opaque light blocking membrane, such as substantially opaque light blocking membrane 1400. For example, a plurality of zones of diffuser 1200 can comprise a third zone, which can correspond to a third subset of light sources comprised by system 1000.

Camera and/or Machine Vision system 1700 can be communicatively coupled to information devices via a network 1800. For example, image information can be transmitted from camera and/or Machine Vision system 1700 to an information device 1900. Information device 1900 can comprise a user interface 1920, a user program 1940, and a memory device 1960. User program 1940 can be adapted to process image information received from camera and/or Machine Vision system 1700. User interface 1920 can be adapted to render information regarding user program 1940 and/or image information obtained from camera and/or Machine Vision system 1700. Memory device 1960 can be adapted to store image information and/or information related to controlling set of light sources 1100.

A light controller 1980, which can comprise a processor, can control the set of light sources 1100. Light controller 1980 can be adapted to turn on and turn off any subset of the set of light sources 1100. For example, light controller 1980 can be adapted to turn on and off the first subset of light sources without turning on the second subset of LEDs. Light controller 1980 can be adapted to turn on and off the second subset of light sources without turning on the first subset of LEDs. Thereby, light controller 1980 can be adapted to illuminate first zone 1300 and second zone 1500 sequentially and/or substantially simultaneously. Light controller 1980 can vary the intensity of light sources. Light controller 1980 can be adapted to interpret image information and/or automatically determine which LEDs of set of light sources 1100 are illuminated. Light controller 1980 can receive information from, for example, a light meter, camera and/or Machine Vision system 1700, and/or information device 1900, which can be utilized to determine which lights of the set of light sources 1100 to illuminate, and/or an intensity of any light sources illuminated, during any particular time interval.

Figure 2:
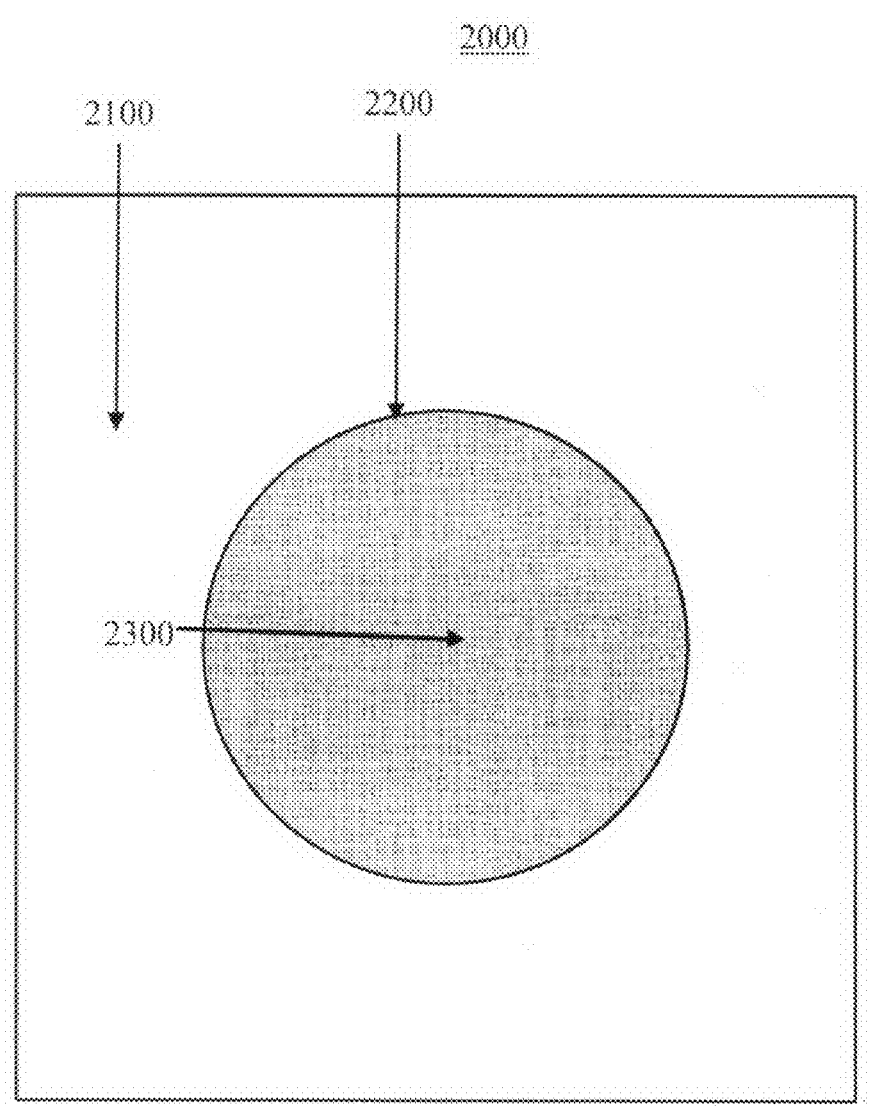
FIG. 2 is a block diagram of an exemplary embodiment of a diffuser 2000.

FIG. 2 is a block diagram of an exemplary embodiment of a diffuser 2000, which can comprise a first zone 2100 and a second zone 2300. First zone 2100 and second zone 2300 can be substantially physically and/or optically segregated by a substantially opaque light blocking membrane 2200. First zone 2100 can be a substantially square area. Second zone 2300 can be an independent substantially round zone substantially surrounded by first zone 2100. Light source subsets corresponding to first zone 2100 and second zone 2300 can be controlled independently of each other and/or can be combined to create one single diffuse light output area. Shape and/or light intensity of first zone 2100 and second zone 2300 can vary and can be flexible. For example, in the illustrated embodiment of diffuser 2000, first zone 2100 is substantially illuminated and second zone 2300 is substantially non-illuminated. When a light source and diffuser are brought together and/or in close proximity, isolated zones can be created, such as first zone 2100 and second zone 2300. In certain exemplary embodiments, a count of zones can vary and can be flexible.

Figure 11:
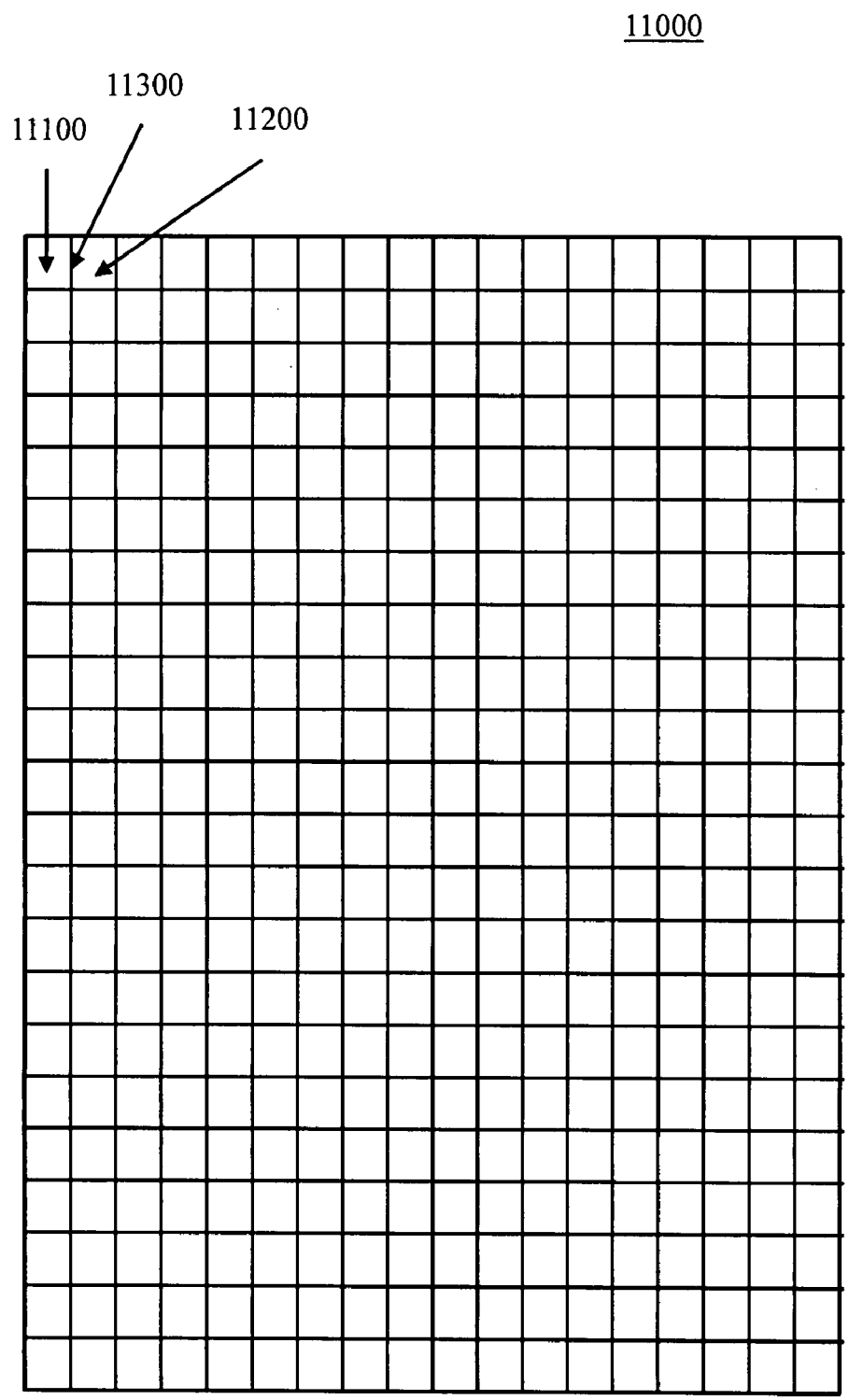
FIG. 11 is a block diagram of an exemplary embodiment of a system 11000.

FIG. 11 is a block diagram of an exemplary embodiment of a system 11000, which can comprise a plurality of separated zones that comprises a first zone 11100 and a second zone 11200. Each pair of the plurality of zones can be physically and/or optically segregated via a corresponding substantially opaque light blocking membrane, such as substantially opaque light blocking membrane 11300 that can be adapted to segregate first zone 11100 from second zone 11200. The plurality of segregated zones can correspond in count and/or location to a plurality of light sources. An information device can control an illumination and/or an illumination intensity of each of the plurality of light sources to illuminate a component in a desired and/or determined manner.

Figure 3:
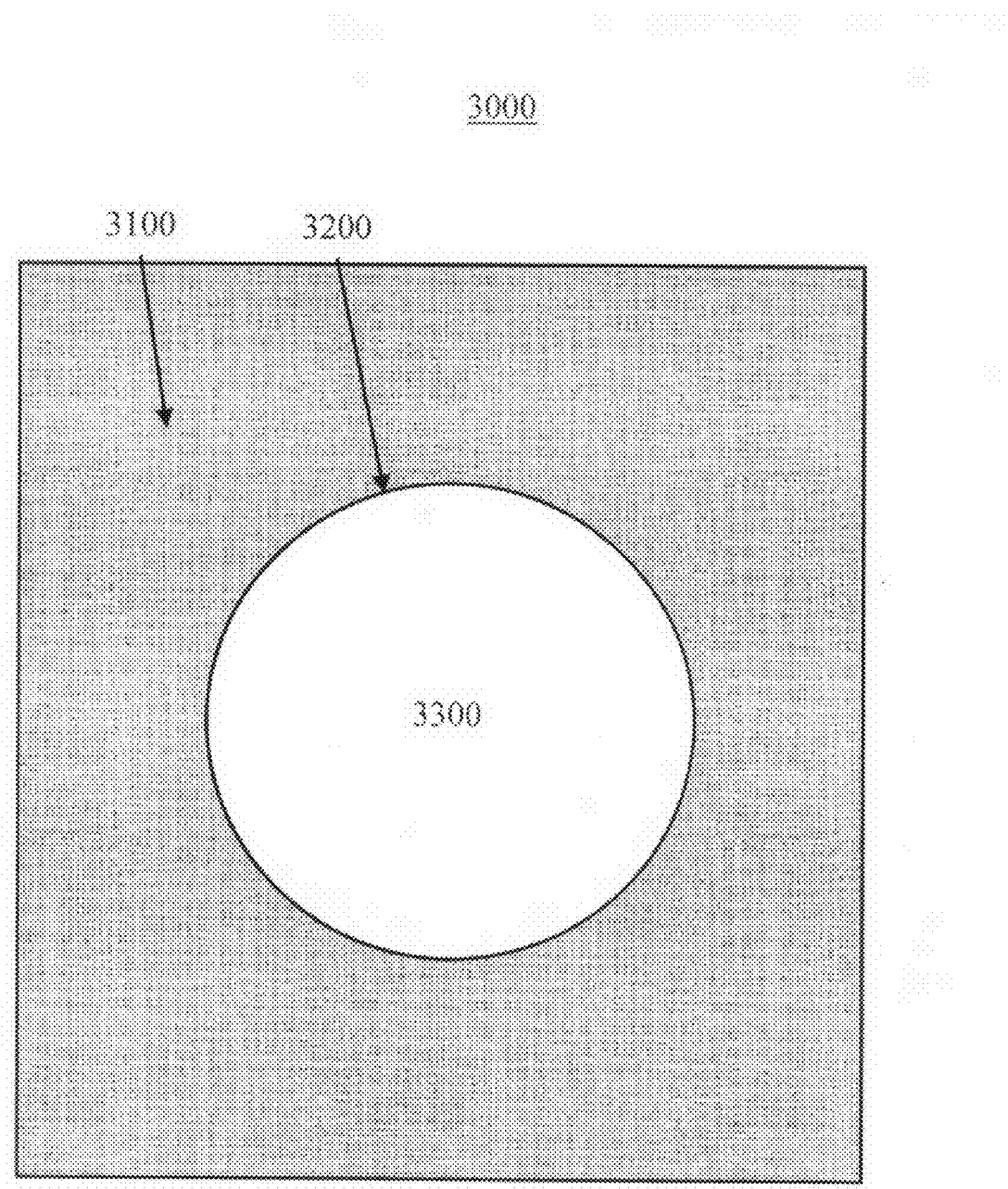
FIG. 3 is a block diagram of an exemplary embodiment of a diffuser 3000.

FIG. 3 is a block diagram of an exemplary embodiment of a diffuser 3000, which can comprise a first zone 3100 and a second zone 3300. First zone 3100 and second zone 3300 can be substantially physically and/or optically segregated by a substantially opaque light blocking membrane 3200. First zone 3100 can be a substantially square area. Second zone 3300 can be an independent substantially round zone substantially surrounded by first zone 3100. Light source subsets corresponding to first zone 3100 and second zone 3300 can be controlled independently of each other and/or can be combined to create one single diffuse light output area. In certain exemplary embodiments, a count of zones can vary and can be flexible. Shape and/or light intensity of first zone 3100 and second zone 3300 can vary and can be flexible. For example, in the illustrated embodiment of diffuser 3000, first zone 3100 is substantially non-illuminated and second zone 3300 is substantially illuminated. When a light source and diffuser are brought together and/or in close proximity, isolated zones can be created, such as first zone 3100 and second zone 3300

Figure 4:
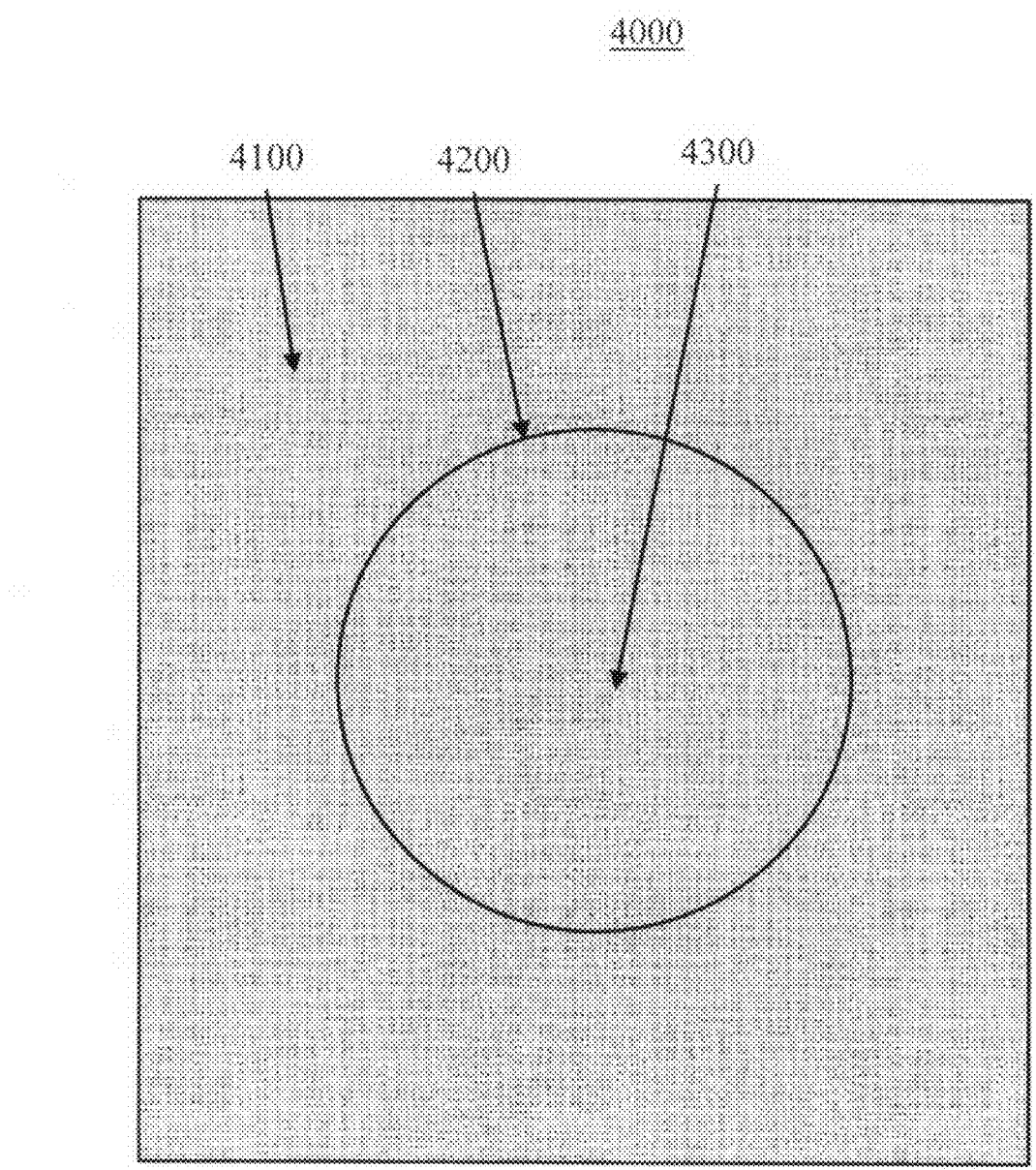
FIG. 4 is a block diagram of an exemplary embodiment of a diffuser 4000.

FIG. 4 is a block diagram of an exemplary embodiment of a diffuser 4000, which can comprise a first zone 4100 and a second zone 4300. First zone 4100 and second zone 4300 can be substantially physically and/or optically segregated by a substantially opaque light blocking membrane 4200. First zone 4100 can be a substantially square area. Second zone 4300 can be an independent substantially round zone substantially surrounded by first zone 4100. Light source subsets corresponding to first zone 4100 and second zone 4300 can be controlled independently of each other and/or can be combined to create one single diffuse light output area. In certain exemplary embodiments, a count of zones can vary and can be flexible. Shape and/or light intensity of first zone 4100 and second zone 4300 can vary and can be flexible. For example, in the illustrated embodiment of diffuser 4000, first zone 4100 is substantially non-illuminated and second zone 4300 is substantially non-illuminated. When a light source and diffuser are brought together and/or in close proximity, isolated zones can be created, such as first zone 4100 and second zone 4300.

Figure 5:
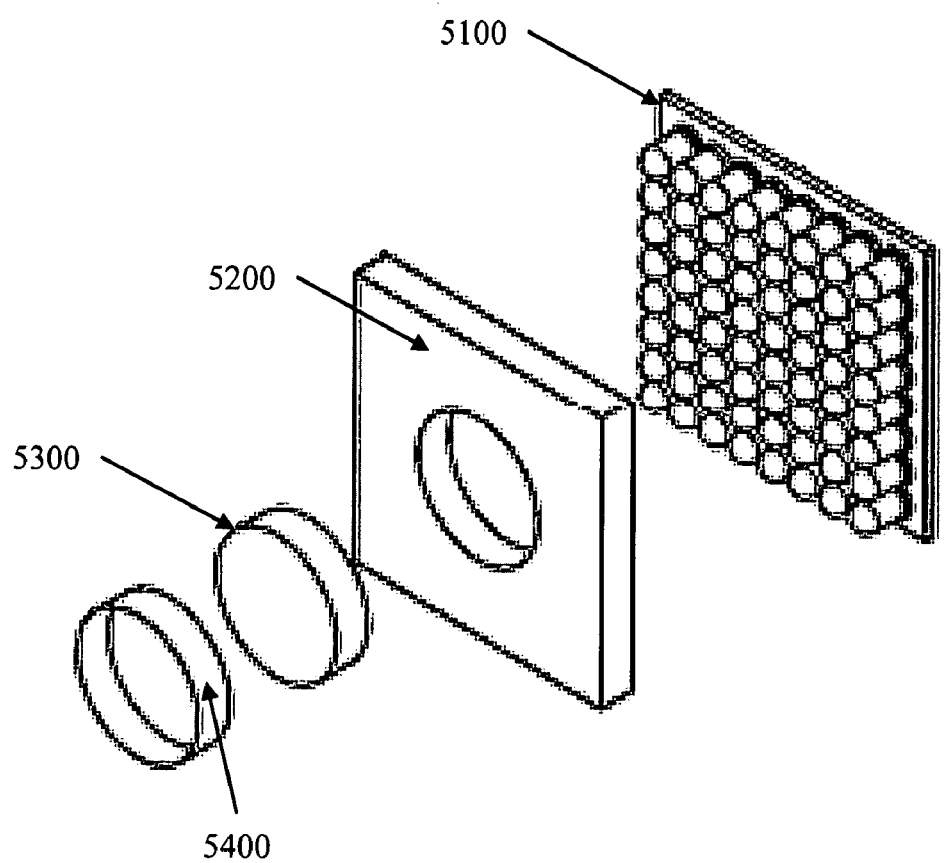
FIG. 5 is a block diagram of an exemplary embodiment of a system 5000.

FIG. 5 is a block diagram of an exemplary embodiment of a system 5000, which can comprise a set of light sources 5100, a first diffuser zone 5200, a second diffuser zone 5300, and a substantially opaque light blocking membrane 5400. Light blocking membrane 5400 can be physically and/or optically coupled to second diffuser zone 5300 and substantially opaque to light emitted by a set of light sources, such as LEDs.

Figure 6:
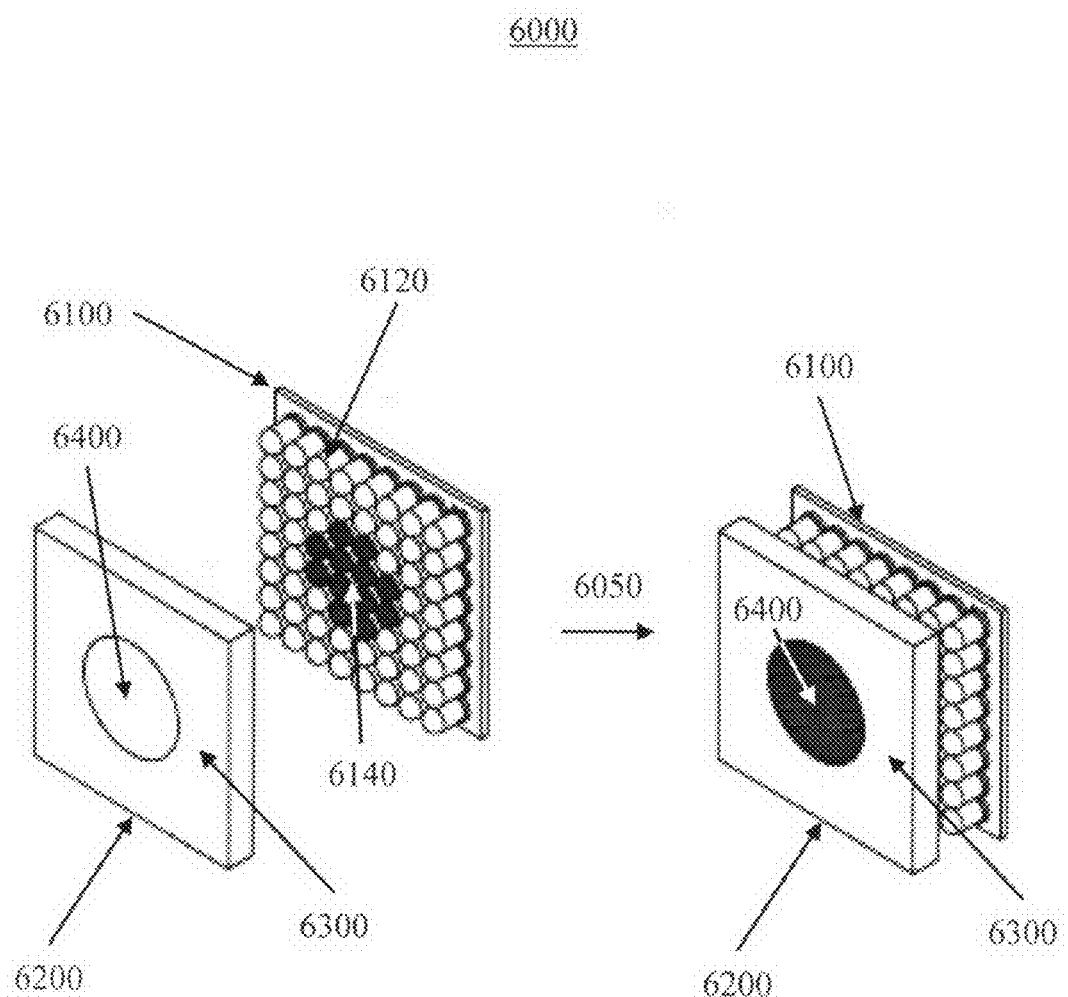
FIG. 6 is a block diagram of an exemplary embodiment of a system 6000.

FIG. 6 is a block diagram of an exemplary embodiment of a system 6000, which can comprise a set of light sources 6100 and a diffuser 6200. Set of light sources 6100 can comprise a first subset of light sources 6120 and a second subset of light sources 6140. For example, set of light sources 6100, first subset of light sources 6120 and second subset of light sources 6140 can each be light emitting diodes (LEDs). In the illustrated embodiment, first subset of light sources 6120 is substantially illuminated and second set of light sources 6140 is substantially non-illuminated. First subset of light sources 6120 can correspond in size and shape to first zone 6300 of diffuser 6200. Second subset of light sources 6140 can correspond in size and shape to second zone 6400 of diffuser 6200. First zone 6300 and second zone 6400 can be physically and/or optically segregated via a substantially opaque light blocking membrane. As illustrated, when an activity 6050 brings set of light sources 6100 and diffuser 6200 relatively close together, first zone 6300 can be illuminated by first subset of light sources 6120 and the substantially opaque light blocking membrane can resist illumination of second zone 6400.

Figure 7:
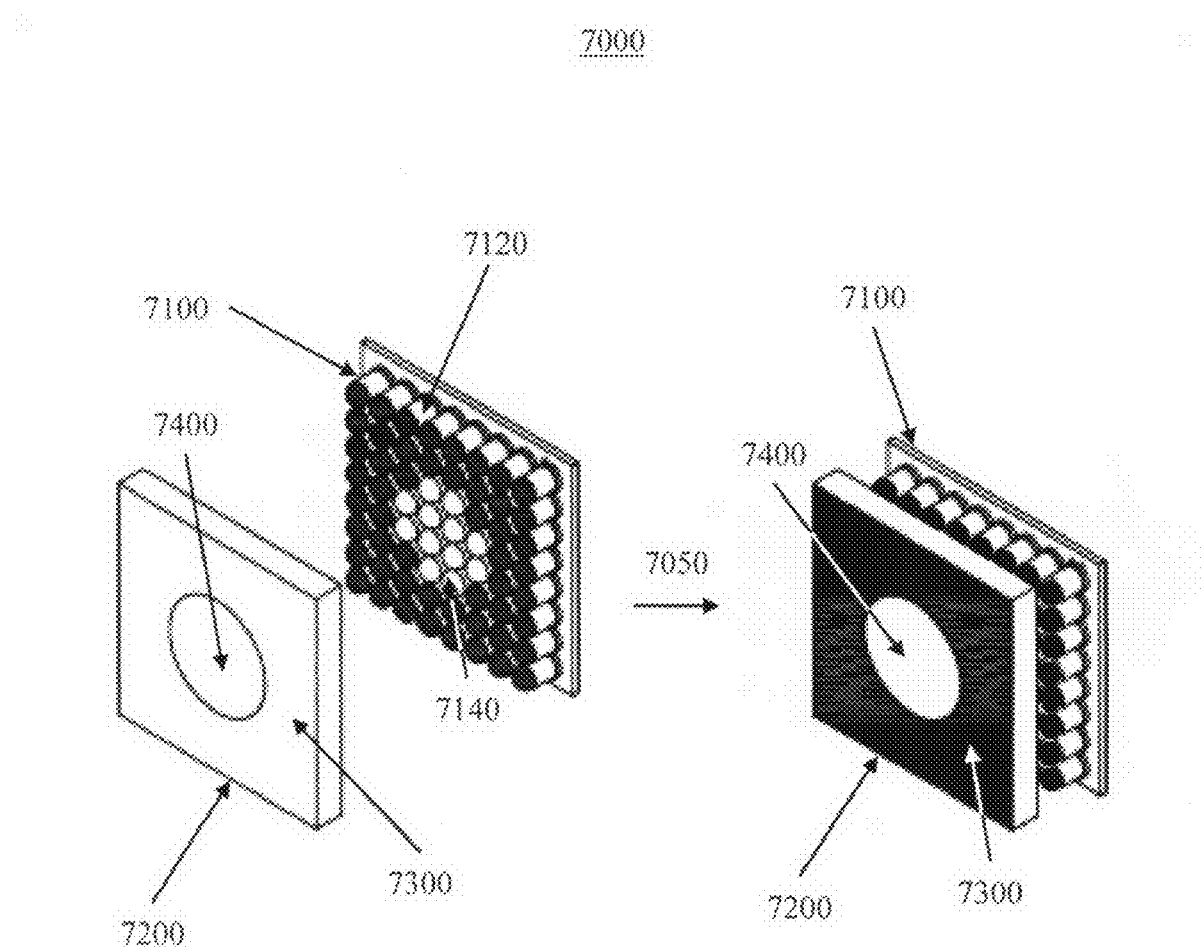
FIG. 7 is a block diagram of an exemplary embodiment of a system 7000.

FIG. 7 is a block diagram of an exemplary embodiment of a system 7000, which can comprise a set of light sources 7100 and a diffuser 7200. Set of light sources 7100 can comprise a first subset of light sources 7120 and a second subset of light sources 7140. In the illustrated embodiment, first subset of light sources 7120 is substantially non-illuminated and second set of light sources 7140 is substantially illuminated. First subset of light sources 7120 can correspond in size and shape to first zone 7300 of diffuser 7200. Second subset of light sources 7140 can correspond in size and shape to second zone 7400 of diffuser 7200. First zone 7300 and second zone 7400 can be physically and/or optically segregated via a substantially opaque light blocking membrane. As illustrated, when an activity 7050 brings set of light sources 7100 and diffuser 7200 relatively close together, second zone 7400 can be illuminated by second subset of light sources 7140 and the substantially opaque light blocking membrane can resist illumination of first zone 7300.

Figure 8:
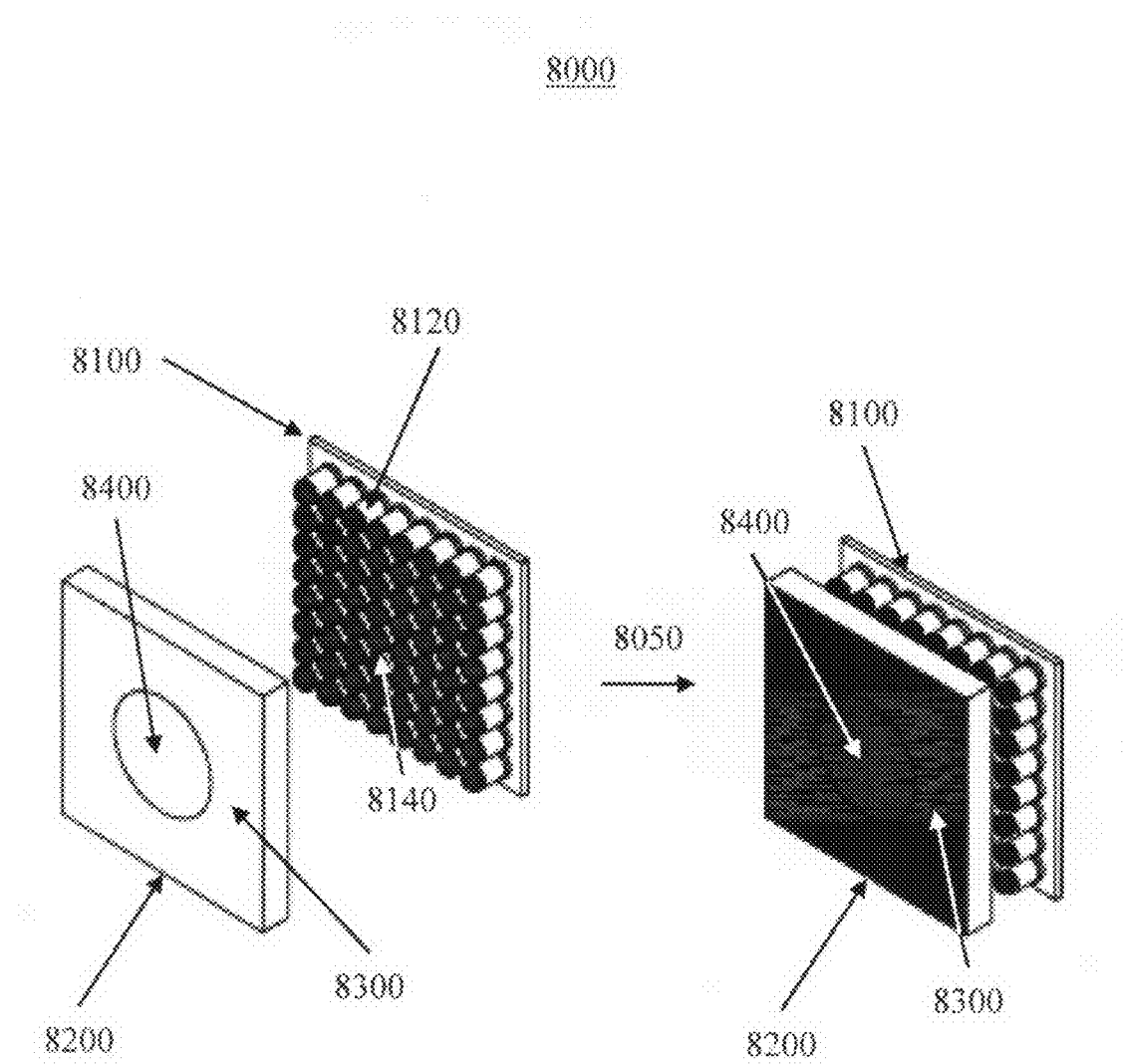
FIG. 8 is a block diagram of an exemplary embodiment of a system 8000.

FIG. 8 is a block diagram of an exemplary embodiment of a system 8000, which can comprise a set of light sources 8100 and a diffuser 8200. Set of light sources 8100 can comprise a first subset of light sources 8120 and a second subset of light sources 8140. In the illustrated embodiment, first subset of light sources 8120 is substantially non-illuminated and second set of light sources 8140 is substantially non-illuminated. First subset of light sources 8120 can correspond in size and shape to first zone 8300 of diffuser 8200. Second subset of light sources 8140 can correspond in size and shape to second zone 8400 of diffuser 8200. First zone 8300 and second zone 8400 can be physically and/or optically segregated via a substantially opaque light blocking membrane. As illustrated, when an activity 8050 brings set of light sources 8100 and diffuser 8200 relatively close together, first zone 8300 and second zone 8400 can be substantially non-illuminated.

Figure 9:
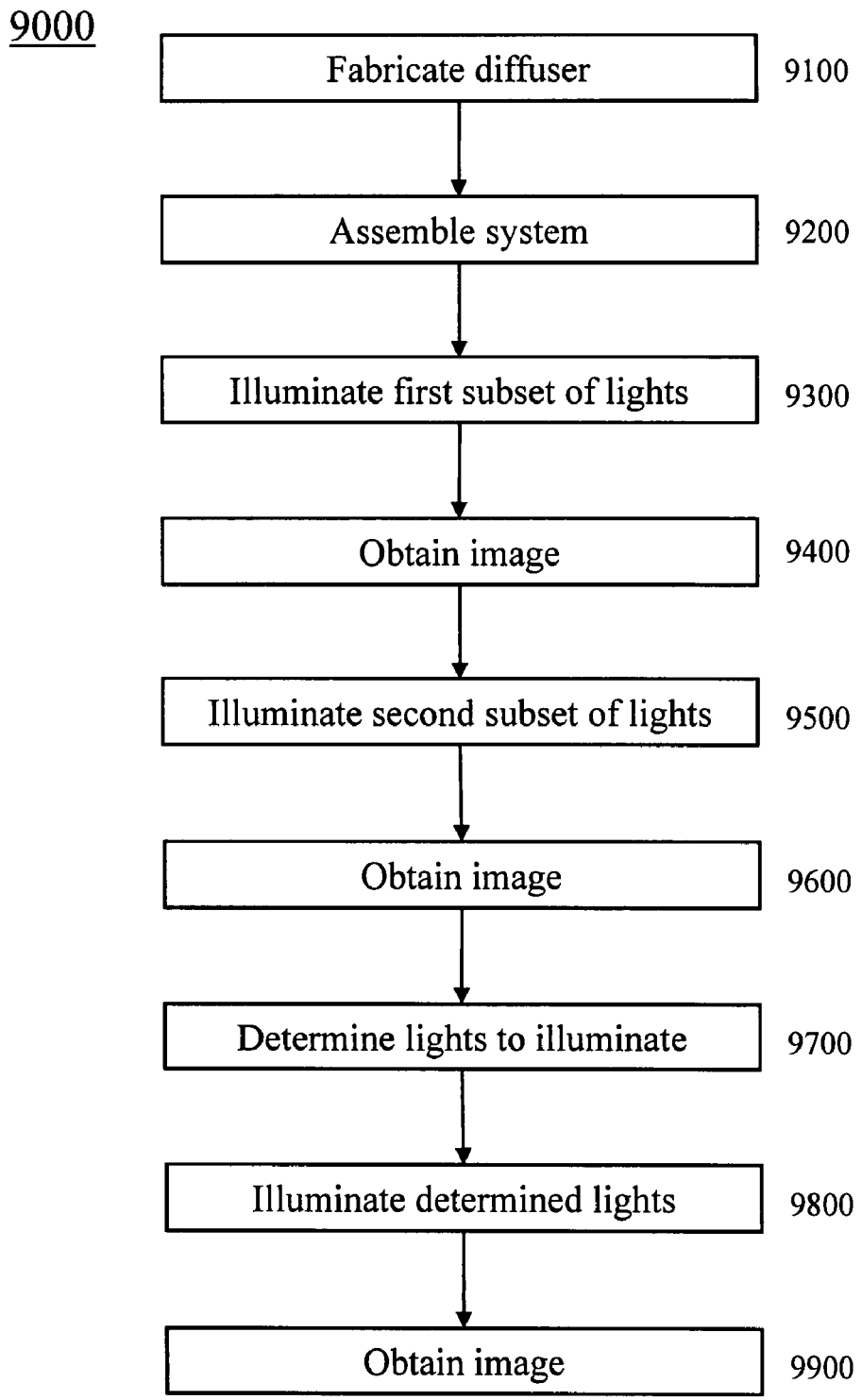
FIG. 9 is a flowchart of an exemplary embodiment of a method 9000.

FIG. 9 is a flowchart of an exemplary embodiment of a method 9000. Any activity or subset of activities of method 9000 can be performed manually and/or automatically. In certain exemplary embodiments, one or more of the activities of method can be implemented via machine instructions stored on and/or comprised by a machine-readable medium. At activity 9100, a diffuser can be fabricated. The diffuser can be fabricated from substantially similar materials or different materials. The diffuser comprising a plurality of zones can be utilized in conjunction with corresponding light sources to each zone in order to improve illumination in imaging and/or Machine Vision systems. If a first illumination of a component is unsuccessful, illumination of the component can be manually and/or automatically changed in order to improve imaging and/or inspection of the component.

At activity 9200, a system comprising the diffuser can be assembled and/or provided to a user. The system can comprise a plurality of light sources, such as LEDs, which can be illuminated and/or adapted to direct light energy through the diffuser to illuminate the component. The set of LEDs can comprise a first subset of LEDs and a second subset of LEDs. Light from the set of LEDs can be adapted to pass through the diffuser. The diffuser can comprise a first zone, a second zone, and a light blocking membrane. The first zone can be coupled to the light blocking membrane and physically and optically segregated from the second zone by the light blocking membrane. The light blocking membrane can be coupled to the second zone and substantially opaque to light emitted by the set of LEDs. The first zone can correspond to the first subset of LEDs. The second zone can correspond to the second subset of LEDs. The system can comprise a camera and/or a Machine Vision subsystem adapted to obtain and/or interpret image information regarding the component.

At activity 9300, a first subset of light sources can be illuminated. Via a light controller, illumination of the first subset of light emitting diodes (LEDs) can be controlled. The light controller can be adapted to illuminate the first subset of LEDs without turning on the second subset of LEDs. The light controller can be adapted to illuminate the second subset of LEDs without turning on the first subset of LEDs. The light controller can be adapted to turn on any combination of subsets of the plurality of light sources sequentially and/or substantially simultaneously. The light controller can be adapted to control an intensity of each light source of the plurality of light sources and/or the intensity of any subset or combination of subsets of the plurality of light sources.

At activity 9400, the first image can be obtained, analyzed, decoded, and/or interpreted, such as via a light controller, a camera, Machine Vision system, and/or an information device. The camera, Machine Vision system, and/or information device can be adapted to interpret the first image of the component and/or characterize one or more qualitative and/or quantitative characteristics of the image of the component.

At activity 9500, responsive to information obtained from the first image, a second set of light sources can be illuminated. The second set of light sources can be manually and/or automatically selected in order to improve illumination of one or more predetermined features of the component.

At activity 9600, a second image can be obtained, analyzed, decoded, and/or interpreted, such as via the camera, Machine Vision system, and/or the information device. The camera, Machine Vision system, and/or information device can be adapted to interpret the second image of the component and/or characterize one or more qualitative and/or quantitative characteristics of the image of the component.

At activity 9700, responsive to information obtained from the first and the second image, a determination can be made of a determined set of light sources, subset of light sources and/or combinations of subsets of light sources to be illuminated. In certain exemplary embodiments, all light sources of the plurality of light sources can be illuminated. In certain exemplary embodiments, a subset of the plurality of light sources can be automatically selected based upon a determination that one or more determined features of the component should have more or less illumination in order to provide desired image qualities. In certain exemplary embodiments, the intensity of one or more of the plurality of light sources can be varied in order to illuminate the component in a desired manner.

At activity 9800, the determined set of light sources can be illuminated by the light controller. The light controller can be adapted to sequentially and/or continuously vary the intensity of the determined set of light sources as image data is obtained and/or analyzed.

At activity 9900, a third image can be obtained, analyzed, decoded, and/or interpreted, such as via the camera, Machine Vision system, and/or the information device. The camera, Machine Vision system, and/or information device can be adapted to interpret the third image of the component and/or characterize one or more qualitative and/or quantitative characteristics of the image of the component. The camera, Machine Vision system, and/or information device can be adapted to determine if any additional images should be obtained and/or any activity or subset of activities of method 9000 should be repeated.

Figure 10:
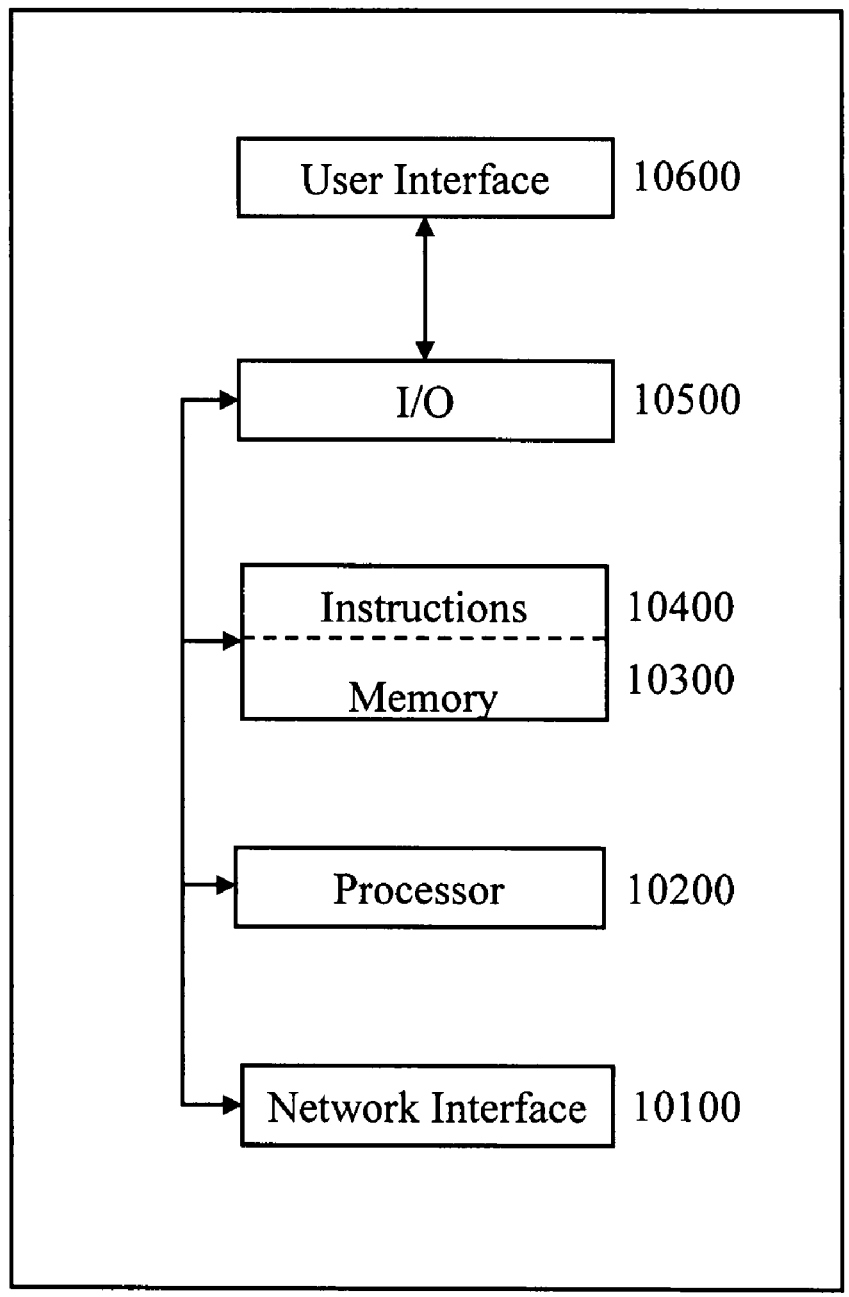
FIG. 10 is a block diagram of an exemplary embodiment of an information device 10000.

FIG. 10 is a block diagram of an exemplary embodiment of an information device 10000, which in certain operative embodiments can comprise, for example, user information device 1900 of FIG. 1. Information device 10000 can comprise any of numerous components, such as for example, one or more network interfaces 10100, one or more processors 10200, one or more memories 10300 containing instructions 10400, one or more input/output (I/O) devices 10500, and/or one or more user interfaces 10600 coupled to I/O device 10500, etc.

In certain exemplary embodiments, via one or more user interfaces 10600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
    active area—an area of a device that emits light.
    activity—an action, act, deed, function, step, and/or process and/or a portion thereof.
    adapted to—suitable, fit, and/or capable of performing a specified function.
    adjacent—in close proximity to, near, next to, and/or adjoining.
    and/or—either in conjunction with or in alternative to.
    apparatus—an appliance or device for a particular purpose.
    approximately—about and/or nearly the same as.
    associated with—related to.
    at least—not less than.
    automatically—acting and/or operating in a manner essentially independent of external human influence and/or control. For example, an automatic light switch can turn on upon "seeing" a person in its view, without the person manually operating the light switch.
    based upon—determined in consideration of and/or derived from.
    between—in a separating interval and/or intermediate to.
    blocking membrane—a substantially opaque element.
    camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.).
    can—is capable of, in at least some embodiments.
    capable—a potential for use.
    capture—to obtain and/or record image data in preparation for processing and/or storage.
    cause—to bring about, provoke, precipitate, produce, elicit, be the reason for, result in, and/or effect.
    circuit—an electrically conductive pathway and/or a communications connection established across two or more switching devices comprised by a network and between corresponding end systems connected to, but not comprised by the network.
    component—a constituent element and/or part.
    comprised by—included by.
    comprise—to include but not be limited to.
    control—to direct.
    controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.
    corresponding—related, associated, accompanying, similar in purpose and/or position, conforming in every respect, and/or equivalent and/or agreeing in amount, quantity, magnitude, quality, and/or degree.
    couple—to join, connect, and/or link two things together.
    data—distinct pieces of information, usually formatted in a special or predetermined way and/or organized to express concepts.
    define—to establish the meaning, relationship, outline, form, and/or structure of; and/or to precisely and/or distinctly describe and/or specify.
    design—(n) a purposeful arrangement of parts and/or details. For example, the design of a product and/or process can comprise designing predetermined aspects of the product and/or process. (v) to plan, such as in a manner that comprises the development of a graphic representation.
    determine—to obtain, calculate, decide, deduce, establish, and/or ascertain.
    device—a machine, manufacture, and/or collection thereof
    diffuser—a substantially translucent structure adapted to expand the diameter of a light source and reduce the effects of focused and/or collimated lighting; a substrate that redistributes light as the light passes through it, creating a more homogeneous emission of light.
    dimension—size.
    emit—to give off, send forth, and/or discharge.
    first—an initial entity in an ordering.
    flow—a continuous transfer.
    for—with a purpose of.
    from—used to indicate a source.
    further—in addition.

have—to be identified by.

illuminate—to light and/or cause light to be incident thereon.

image—an at least two-dimensional, observed representation of an entity and/or phenomenon.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

instructions—directions adapted to perform a particular operation or function. Can be implemented as firmware and/or software.

intensity—a quantity of light emitted and/or reflected in a predetermined time period and/or in a predetermined area.

interpret—to make sense of and/or assign a meaning to.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

light—(n) a device and/or system adapted to provide illumination; (v) to provide electromagnetic radiation to which organs of sight react, ranging in wavelength from approximately 400 to approximately 700 nm.

light controller—a controller that is adapted to cause an illumination of one or more light sources and/or adapted to provide intensity control of each light source.

light emitting diode (LED)—a semiconductor device that emits light responsive to an applied electrical conducting current including ultraviolet and infrared wavelengths.

light source—a device that emits light responsive to an applied electrical conducting current including ultraviolet and infrared wavelengths.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—capable of being discerned by an information device.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

Machine Vision—devices and/or systems adapted to use video cameras, robots, other devices, and/or computers to obtain and/or analyze visual and/or video information pertaining to an operation or activity.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

obtain—to receive, get, take possession of, procure, acquire, calculate, determine, and/or compute.

opaque—substantially and/or completely impenetrable to light and/or a form of radiant energy other than light.

optically segregated—not allowing a passage of light between.

pair—a quantity of two of something.

pass—to convey, transfer, and/or transmit.

physically segregated—spaced apart.

plurality—the state of being plural and/or more than one.

position—to put in place.

predetermined—established in advance.

prevent—to impede, hinder, stop, and/or keep from happening.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, give, convey, send, and/or make available.

receive—to gather, take, acquire, obtain, accept, get, and/or have bestowed upon.

regarding—pertaining to.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

transmit—to send as a signal, provide, furnish, and/or supply.

said—when used in a system or device claim, an article indicating a subsequent claim term that has been previously introduced.

second—an entity immediately following a first entity in an ordering.

segregate—to separate.

sequentially—a in an ordered consecutive manner.

set—a related plurality of predetermined elements; and/or one or more distinct items and/or entities having a specific common property or properties.

shape—a characteristic surface, outline, and/or contour of an entity.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

simultaneously—at substantially the same time.

subset—a portion of a set.

substantially—to a considerable, large, and/or great, but not necessarily whole and/or entire, extent and/or degree.

system—a collection of mechanisms, devices, data, and/or instructions, the collection designed to perform one or more specific functions.

through—in one side and out another side of.

turn on—to put into operation and/or activate.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

via—by way of and/or utilizing.

wherein—in regard to which; and; and/or in addition to.

which—what particular one or ones.

without—not accompanied by.

zone—an area and/or region distinguished from adjacent parts by a distinctive feature and/or characteristic.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:
providing a set of light sources, the set of light sources including at least a first subset of light sources and a second subset of light sources;
coupling a diffuser to the set of light sources, the diffuser including at least a first zone optically coupled to the first subset of light sources and a second zone optically coupled to the second subset of light sources, wherein the first zone is physically and optically separated from the second zone by a light-blocking membrane; and
coupling a light controller to the set of light sources, the light controller adapted to illuminate the first subset of light sources, the second subset of light sources, or both the first and second subsets of light sources.

2. The method of claim 1, further comprising:
illuminating said first subset of light sources without illuminating said second subset of light sources.

3. The method of claim 1, further comprising:
illuminating said second subset of light sources without illuminating said first subset of light sources.

4. The method of claim 1, further comprising:
illuminating said first subset of light sources and said second subset of light sources sequentially.

5. The method of claim 1, further comprising:
illuminating said first subset of light sources and said second subset of light sources substantially simultaneously.

6. The method of claim 1, further comprising:
positioning a component relative to the diffuser such that the component can be illuminated by said set of light sources and said diffuser.

7. The method of claim 1, further comprising:
positioning a camera adjacent to said diffuser, said camera adapted to obtain an image of a component illuminated by said set of light sources.

8. The method of claim 1, further comprising:
communicatively coupling a Machine Vision information device to a camera positioned adjacent to said diffuser, said Machine Vision information device adapted to interpret an obtained image illuminated by said set of light sources.

9. The method of claim 1, wherein the diffuser further comprises a third zone and said set of light sources further comprises a corresponding third subset of light sources.

10. The method of claim 1, wherein said light controller is adapted to independently control each light source of said set of light sources.

11. The method of claim 1, wherein said light controller is adapted to control an intensity of light energy emitted by at least one light source of said set of light sources.

12. The method of claim 1, wherein said light controller is adapted to independently control an intensity of light energy emitted by each light source of said set of light sources.

13. The method of claim 1, wherein the number of diffuser zones is approximately equal to the number of light sources in said set of light sources.

14. The method of claim 1, wherein said light controller is adapted to interpret image information captured by a camera and automatically determine which light sources of said set of light sources to illuminate to improve the image.

15. An apparatus comprising:
- a set of light sources including at least a first subset of light sources and a second subset of light sources;
- a diffuser coupled to the set of light sources, the diffuser including at least a first zone optically coupled to the first subset of light sources and a second zone optically coupled to the second subset of light sources, wherein the first zone is physically and optically separated from the second zone by a light-blocking membrane; and
- a light controller coupled to the set of light sources, the light controller adapted to illuminate the first subset of light sources, the second subset of light sources, or both the first and second subsets of light sources.

16. The apparatus of claim 15 wherein the light controller can illuminate the first subset of light sources without illuminating the second subset of light sources.

17. The apparatus of claim 15 wherein the light controller can illuminate the second subset of light sources without illuminating the first subset of light sources.

18. The apparatus of claim 15 wherein the light controller can illuminate the first subset of light sources and the second subset of light sources sequentially.

19. The apparatus of claim 15 wherein the light controller can illuminate the first subset of light sources and the second subset of light sources substantially simultaneously.

20. The apparatus of claim 15 wherein the light controller is adapted to independently control each light source of the set of light sources.

21. The apparatus of claim 15 wherein the light controller can control an intensity of light energy emitted by at least one light source of the set of light sources.

22. The apparatus of claim 15 further comprising a camera positioned adjacent to the diffuser, the camera adapted to obtain an image of a component illuminated by the set of light sources.

23. The apparatus of claim 15, further comprising a machine vision information device communicatively coupled to the camera, the machine vision information device adapted to interpret an obtained image illuminated by the set of light sources.

24. The apparatus of claim 15 wherein the diffuser further comprises a third zone and the set of light sources further comprises a corresponding third subset of light sources.

25. The apparatus of claim 15 wherein the number of diffuser zones is approximately equal to the number of light sources in the set of light sources.

26. The apparatus of claim 15 wherein the light controller is adapted to interpret image information captured by a camera and automatically determine which light sources of the set of light sources to illuminate to improve the image.

27. A system comprising:
- a lighting apparatus including:
  - a set of light sources including at least a first subset of light sources and a second subset of light sources,
  - a diffuser coupled to the set of light sources, the diffuser including at least a first zone optically coupled to the first subset of light sources and a second zone optically coupled to the second subset of light sources, wherein the first zone is physically and optically separated from the second zone by a light-blocking membrane, and
  - a light controller coupled to the set of light sources, the light controller adapted to illuminate the first subset of light sources, the second subset of light sources, or both the first and second subsets of light sources; and
- a camera positioned relative to the lighting apparatus to capture an image of a component when the component is illuminated by the lighting apparatus.

28. The system of claim 27 wherein the light controller can illuminate the first subset of light sources without illuminating the second subset of light sources.

29. The system of claim 27 wherein the light controller can illuminate the second subset of light sources without illuminating the first subset of light sources.

30. The system of claim 27 wherein the light controller can illuminate the first subset of light sources and the second subset of light sources sequentially.

31. The system of claim 27 wherein the light controller can illuminate the first subset of light sources and the second subset of light sources substantially simultaneously.

32. The system of claim 27 wherein the light controller can illuminate the first subset of light sources without illuminating the second subset of light sources.

33. The system of claim 27 wherein the light controller can illuminate the second subset of light sources without illuminating the first subset of light sources.

34. The system of claim 27, further comprising a machine vision information device coupled to the camera, the machine vision information device adapted to interpret an obtained image illuminated by the set of light sources.

35. The system of claim 34 wherein the machine vision information device is coupled to the light controller and can automatically determine which light sources of the set of light sources to illuminate to improve the image.

36. The system of claim 27 wherein the camera is coupled to the light controller and the light controller is adapted to interpret image information captured by a camera and automatically determine which light sources of the set of light sources to illuminate to improve the image.

* * * * *